United States Patent
Kawaguchi et al.

(10) Patent No.: US 10,540,034 B2
(45) Date of Patent: Jan. 21, 2020

(54) INPUT DEVICE HAVING OPTIMUM PORTABILITY AND ELECTRONIC APPARATUS INCLUDING THE SAME

(71) Applicant: SONY CORPORATION, Tokyo (JP)

(72) Inventors: Hiroto Kawaguchi, Kanagawa (JP); Manabu Kodate, Kanagawa (JP); Munetake Ebihara, Tokyo (JP); Sayaka Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/026,831

(22) PCT Filed: Jul. 31, 2014

(86) PCT No.: PCT/JP2014/004031
§ 371 (c)(1),
(2) Date: Apr. 1, 2016

(87) PCT Pub. No.: WO2015/056376
PCT Pub. Date: Apr. 23, 2015

(65) Prior Publication Data
US 2016/0239135 A1      Aug. 18, 2016

(30) Foreign Application Priority Data

Oct. 16, 2013  (JP) .................. 2013-215507

(51) Int. Cl.
*G06F 3/041* (2006.01)
*G06F 1/16* (2006.01)
(Continued)

(52) U.S. Cl.
CPC ............ *G06F 3/0414* (2013.01); *G06F 1/163* (2013.01); *G06F 3/016* (2013.01); *G06F 3/044* (2013.01); *G06F 3/0416* (2013.01); *G06F 3/16* (2013.01)

(58) Field of Classification Search
CPC ......... G06F 3/0414; G06F 3/0416; G06F 3/16
See application file for complete search history.

(56) References Cited

U.S. PATENT DOCUMENTS 5,305,181 A * 4/1994 Schultz ................... B60R 11/02
                                                             345/168
6,619,836 B1 * 9/2003 Silvant .................... G04G 17/08
                                                             368/281
(Continued)

FOREIGN PATENT DOCUMENTS

GB        2411552 A     8/2005
JP        08-030378     2/1996
(Continued)

OTHER PUBLICATIONS

Extended European Search Report of EP Patent Application No. 14853751.7, dated Apr. 12, 2017, 07 pages.

*Primary Examiner* — Nitin Patel
*Assistant Examiner* — Robert M Stone
(74) *Attorney, Agent, or Firm* — Chip Law Group

(57) ABSTRACT

To provide an input device having optimal portability and electronic apparatus including the same. The input device includes an input section, a control section, a power supply section, and a support section. The input section has a detection surface, and outputs a detection signal corresponding to a pressing position and a pressing amount on a detection surface. The control section determines the pressing position and the pressing amount based on the detection signal. The power supply section supplies electricity to the input section and the control section. The support section is user wearable, and supports the input section, the control section, and the power supply section.

18 Claims, 9 Drawing Sheets

(51) Int. Cl.
*G06F 3/044* (2006.01)
*G06F 3/01* (2006.01)
*G06F 3/16* (2006.01)

(56) References Cited

U.S. PATENT DOCUMENTS

| | | | |
|---|---|---|---|
| D742,874 S * | 11/2015 | Cheng | D14/344 |
| 2002/0012292 A1 * | 1/2002 | Mitamura | A44C 5/0015 368/281 |
| 2003/0030595 A1 * | 2/2003 | Radley-Smith | A44C 5/0007 345/1.3 |
| 2003/0133515 A1 * | 7/2003 | Kondo | G06F 1/1616 375/295 |
| 2008/0318636 A1 | 12/2008 | Kim | |
| 2010/0029327 A1 * | 2/2010 | Jee | G04G 17/045 455/556.1 |
| 2010/0214243 A1 * | 8/2010 | Birnbaum | G06F 3/016 345/173 |
| 2010/0219943 A1 * | 9/2010 | Vanska | G06F 1/163 340/407.1 |
| 2012/0075243 A1 * | 3/2012 | Doi | G06F 3/044 345/174 |
| 2012/0203076 A1 * | 8/2012 | Fatta | A61B 5/681 600/300 |
| 2013/0154970 A1 * | 6/2013 | Seo | G06F 3/0488 345/173 |
| 2013/0222270 A1 * | 8/2013 | Winkler | H04M 1/0233 345/173 |
| 2013/0271389 A1 * | 10/2013 | Lyons | G04G 17/083 345/173 |
| 2013/0271495 A1 * | 10/2013 | Nguyen | G04G 17/083 345/649 |
| 2013/0329150 A1 * | 12/2013 | Kim | G02F 1/13338 349/42 |
| 2014/0062892 A1 * | 3/2014 | Dickinson | G06F 3/0412 345/173 |
| 2014/0120983 A1 * | 5/2014 | Lam | H04W 84/18 455/557 |
| 2014/0198035 A1 * | 7/2014 | Bailey | G06F 3/014 345/156 |
| 2014/0334083 A1 * | 11/2014 | Bailey | G06F 1/163 361/679.03 |
| 2015/0138699 A1 * | 5/2015 | Yamazaki | G06F 1/163 361/679.03 |
| 2015/0177891 A1 * | 6/2015 | Karkkainen | G06F 3/045 345/174 |
| 2015/0189056 A1 * | 7/2015 | Magi | G06F 1/1652 455/566 |
| 2016/0014919 A1 * | 1/2016 | Huitema | G06F 1/1652 313/511 |
| 2016/0026214 A1 * | 1/2016 | Breedvelt-Schouten | G06F 3/017 345/156 |

FOREIGN PATENT DOCUMENTS

| | | |
|---|---|---|
| JP | 2000-321013 | 11/2000 |
| JP | 2003-337541 | 11/2003 |
| JP | 2008-010008 | 1/2008 |
| JP | 2010-272105 | 12/2010 |
| JP | 2011-170659 | 9/2011 |
| WO | 2006-046526 | 5/2006 |
| WO | 2013-025755 | 2/2013 |
| WO | 2013/063276 A1 | 5/2013 |

* cited by examiner

INPUT DEVICE HAVING OPTIMUM PORTABILITY AND ELECTRONIC APPARATUS INCLUDING THE SAME

TECHNICAL FIELD

The present technology relates to a user wearable input device and electronic apparatus including the same.

BACKGROUND ART

Generally, an input device is used for input operation of electronic apparatus. Patent Document 1 discloses an input device including capacitative elements. The input device has a configuration that can detect pressing of a detection surface by a manipulator such as a finger.

Patent Document 1: Japanese Patent Application Laid-open No. 2011-170659

SUMMARY

Technical Problem

In recent years, portable electronic apparatus including a smartphone has become essential for user's life. Therefore, the electronic apparatus requires optimal portability, i.e., the electronic apparatus has to be readily available as necessary and does not obstruct the user's movements.

In view of the circumstances as described above, an object of the present technology is to provide an input device having optimal portability and electronic apparatus including the same.

Means for Solving the Problem

An input device according to the present disclosure includes an input section, a control section, a power supply section, and a support section.

The input section has a detection surface, and outputs a detection signal corresponding to a pressing position and a pressing amount on a detection surface.

The control section determines the pressing position and the pressing amount based on the detection signal.

The power supply section supplies electricity to the input section and the control section.

The support section is user wearable, and supports the input section, the control section, and the power supply section.

Through this configuration, the input device may accept an input operation by user's pressing, and may be carried hands-free.

The support section may be concatenated such that the input device is wearable on a user's arm.

The detection surface may be formed at least one of an outer peripheral surface and an inner peripheral surface of the support section.

Through this configuration, the input device is wearable on a user's arm, whereby the user will be able to use the input device when necessary.

The support section may support the input section, the control section, and the power supply section, and have a plurality of concatenated plate units.

Through this configuration, the input device can be concatenated.

The support section may further include a hinge section that concatenates the plate units.

Through this configuration, the user can feel a comfortable fitting of the input device.

A plurality of the plate units may include an input unit for supporting the input section, a control unit for supporting the control section, and a power supply unit for supporting the power supply section.

Through this configuration, as each plate unit can have each function of the input device, the input device can be simply constituted.

The input unit may have a plurality of the input units.

The control section may determine the pressing position and the pressing amount per the plurality of input units.

Through this configuration, in the input device, the input operation is possible by combining a plurality of the input units, thereby increasing flexibility of the input operation.

The support section may include an elastically deformable C-shaped frame section.

Through this configuration, the input device may be ring-shaped.

The input section may be configured to output a detection signal corresponding to an input operation of squeezing and pressing the detection surface in its own plane direction.

Through this configuration, in the input device, an input operation other than pressing of the detection surface becomes possible.

The input device may further include a communication section supported by the support section and capable of transmitting an operation signal generated based on the pressing position and the pressing amount by the control section to an external device.

Through this configuration, the input operation of an external device without touching the external device will be done in the input device.

The communication section may receive a signal from the external device.

The control section may generate a control signal based on a signal received by the communication section.

Through this configuration, the input device can output corresponding to the signal from the external device.

The input device may further include a notification section supported by the support section and configured to perform a notification based on the control signal.

The notification section may include at least one of a light-emitting element, a sound-emitting element and a vibration element.

Through this configuration, the input device can perform a notification to a user corresponding to the signal from the external device.

The input unit may further include a sensor substrate and an intermediate layer.

The sensor substrate has a plurality of capacitative elements that are placed facing to the detection surface and are arranged in a matrix.

The intermediate layer is placed between the detection surface and the sensor substrate and has a plurality of structures configured to deformably support the detection surface.

The input unit may further include a conductive layer placed between the detection surface and the intermediate layer.

Through this configuration, the input unit can detect the pressing position and the pressing amount on the detection surface by a mutual capacitance method.

The detection surface may include an input guide section configured by at least one of an image and a convex-concave shape.

Through this configuration, the input device can perform an input operation by a user to a correct position on the detection surface.

The input unit may further include a display section on which the detection surface is provided and configured to display an image on the detection surface under control by the control section.

Through this configuration, the input device 1 can correspond to a variety of input operations by changing images displayed on the display section.

An electronic apparatus according to an embodiment of the present disclosure includes an input section, a control section, a power supply section, a support section, and a display device.

The input section has a detection surface, and outputs a detection signal corresponding to a pressing position and a pressing amount on a detection surface.

The control section determines the pressing position and the pressing amount based on the detection signal.

The power supply section supplies electricity to the input section and the control section.

The support section is user wearable, and supports the input section, the control section, and the power supply section.

The display device displays an image corresponding to the operation signal.

Through this configuration, the input device may accept an input operation by user's pressing, and may be carried hands-free.

Effects

As described above, according to the present technology, there are provided an input device having optimal portability and an electronic apparatus including the input device.

MODES FOR CARRYING OUT THE DISCLOSURE

Figure 1:
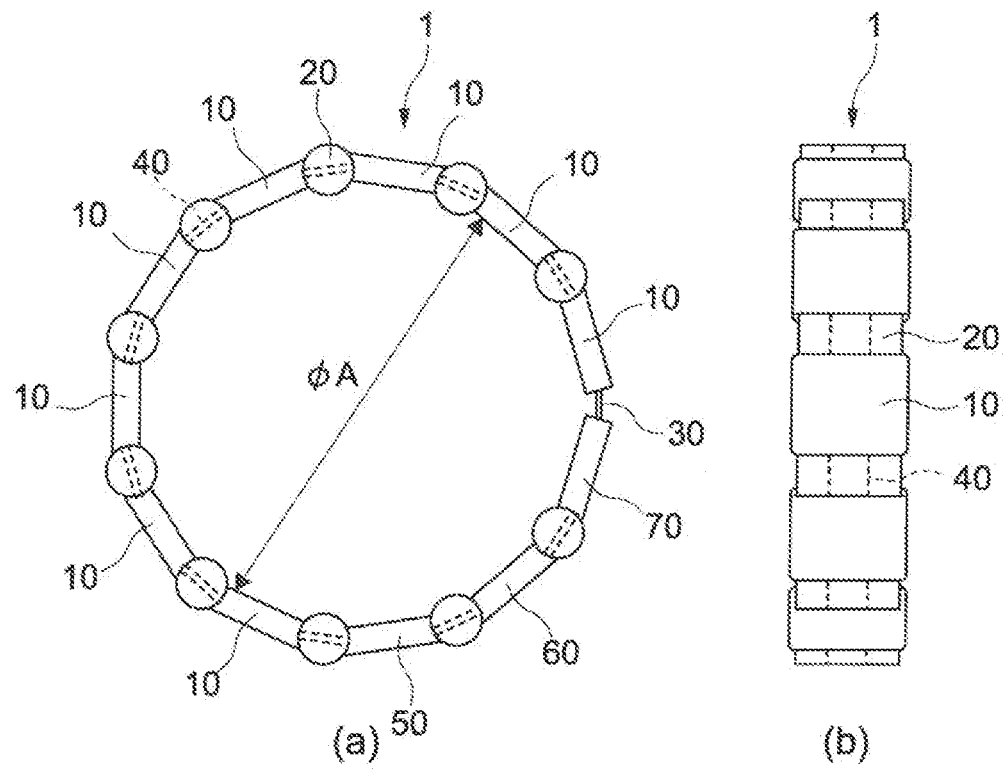
FIG. 1 Schematic diagrams of an input device according to a first embodiment of the present technology.
Figure 1:
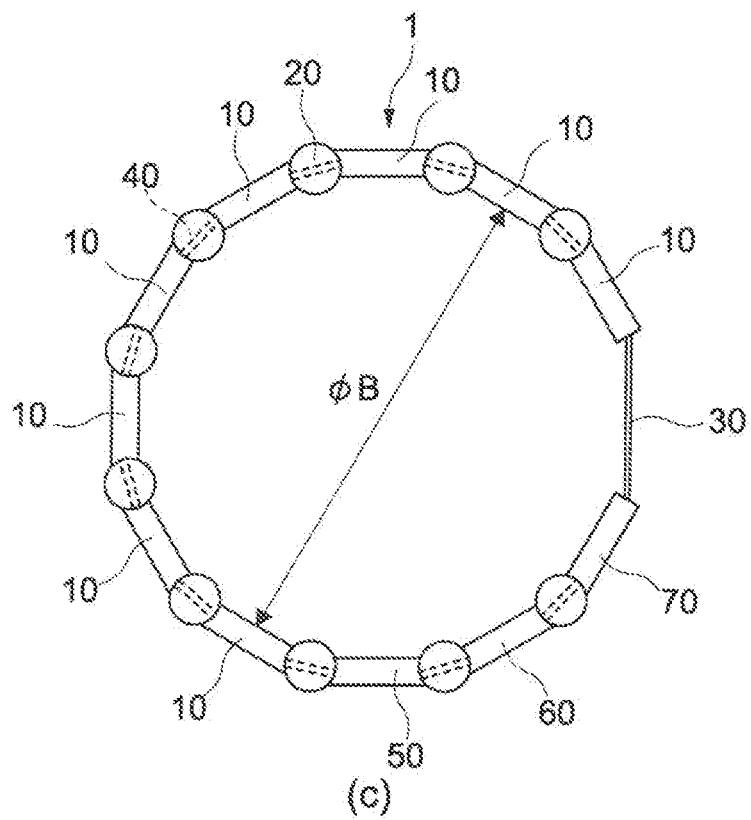

Hereinafter, embodiments of the present technology will be described referring to the drawings.

<First Embodiment>

[Overall Configuration of Input Device 1]

FIG. 1(a) and FIG. 1(c) each is a side view diagram of an input device 1 according to a first embodiment of the present technology. FIG. 1(b) is a plan-view diagram of the input device 1. FIG. 1(a) and FIG. 1(b) each shows a status in which the input device 1 is in not use. FIG. 1(c) shows a status in which the input device 1 is in use. The input device 1 includes input units 10, a control unit 50, a notification unit 60, a power supply unit 70, hinge sections 20, a connection section 30, and wiring sections 40.

The input device 1 is wearable similar to a wristwatch, and is wearable on a user's arm. The input device 1 constitutes a flat plate unit where eight input units 10, one control unit 50, one notification unit 60 and one power supply unit 70 are arranged along an outer periphery of a user's arm. In this manner, the user can carry the input device 1 hands-free.

The hinge sections 20 constitute support sections for articulating the plate units (the input units 10, the control unit 50, the notification unit 60, the power supply unit 70). Each hinge section 20 supports two adjacent plate units such that an angle therebetween can be changed. Therefore, in the input device 1, the angle between the adjacent plate units can be changed corresponding to the shape of the user's arm, thereby providing a comfortable fitting.

The connection section 30 connects the plate units placed at both ends among a plurality of the plate units concatenated into one by the hinge sections 20. In this way, the input device 1 becomes ring-shaped. Thus, the plate units, the hinge sections 20 and the connection section 30 constitute a ring-shaped section of the input device 1. The connection section 30 is constituted of an elastic rubber material, for example. Note that the connection section 30 is not limited to the configuration, and may have any configuration that the plate units placed at both ends can be connected. For example, the connection section 30 may be a buckle used in a typical wristwatch.

An inner diameter ΦA of the input device 1 not in use shown in FIG. 1(a) is set to be smaller than an inner diameter of a typical user's arm. The user wears the input device 1 on the arm by extending the connection section 30 from the status shown in FIG. 1(a) to the inner diameter through which a user's fist can be inserted. The inner diameter ΦB of the input device 1 worn by the user's arm shown in FIG. 1(c) is greater than the inner diameter ΦA, and the input device 1 is firmly fixed to the user's arm by an elastic force of the connection section 30.

Inside of the hinge sections 20, the wiring sections 40 are provided for electrically connecting adjacent plate units. That is to say, eight input units 10, one control unit 50, one notification unit 60 and one power supply unit 70 are mutually electrically connected by the wiring sections 40. The wiring sections 40 are constituted by a flexible print circuit, for example.

The power supply unit 70 is adjacent to the connection section 30. In addition, the notification unit 60 is adjacent to the power supply unit 70, and the control unit 50 is adjacent to the notification unit 60. Since the input units 10 are preferably placed at the position where the user easily perform the input operation, the power supply unit 70, the notification unit 60 and the control unit 50 are tried to be placed at the position where the user is difficult to perform the input operation. Note that the input units 10, the control unit 50, the notification unit 60 and the power supply unit 70 are not limited to the configuration, and may constitute any plate units of the input device 1.

Each input unit 10 can receive the input operation from the user. A plurality of the input units 10 may be used individually for different input operations, and may be used integrated. Each input unit 10 outputs a detection signal to the control unit. 50 based on the user's input operation.

The power supply unit 70 supplies electricity to the input units 10, the control unit 50 and the notification unit 60. The power supply unit 70 includes an power storage element and a power supply circuit, for example. Non-limiting examples of the power storage element applicable to the power supply unit 70 includes a lithium ion cell and a lithium polymer cell. Also, the power supply unit 70 may include a power generation element such as a solar cell.

The control unit 50 controls the input units 10, the notification unit 60 and the power supply unit 70. The control unit 50 typically includes a computer having CPU/MPU, a memory and the like.

The control unit 50 includes a communication section for communicating with an electronic apparatus main body and an external device such as other input device 1. Non-limiting examples of the electronic apparatus being capable of communicating with the input units 10 includes a smartphone and a portable audio player, and the like. The control unit 50 can transmit an operation signal generated based on the detection signal from the input units 10 to the electronic apparatus main body and other input device 1 by the communication section. Also, the control unit 50 receives the signal from the electronic apparatus main body and other input device 1, and can drive the input units 10, the notification unit 60 and the power supply unit 70 based on the signal received.

To the notification unit 60, a variety of parts for notifying the user are mounted. Examples of the parts mounted to the notification unit 60 include a sound-emitting element, a light-emitting element and a vibration element, for example. The notification unit 60 notifies a user by sound, light or vibration under the control by the control unit 50.

As the sound-emitting element, a speaker element is used, for example. The notification unit 60 having the sound-emitting element can notify a user of information based on a sound-emitting status of the sound-emitting element (tone color, sound-emitting time, type of melody, etc.). As the light-emitting element, a light-emitting diode is used, for example. The notification unit 60 having the light-emitting element can notify a user of information based on a light-emitting status of the light-emitting element (light-emitting intensity, light-emitting time, blink speed, blink pattern, etc.). As the vibration element, a vibration motor is used, for example. The notification unit 60 having the vibration element can notify a user of information based on a vibration status of the vibration element (vibration intensity, vibration time, vibration frequency, etc.).

[Method of Using Input Device 1]

Figure 2:
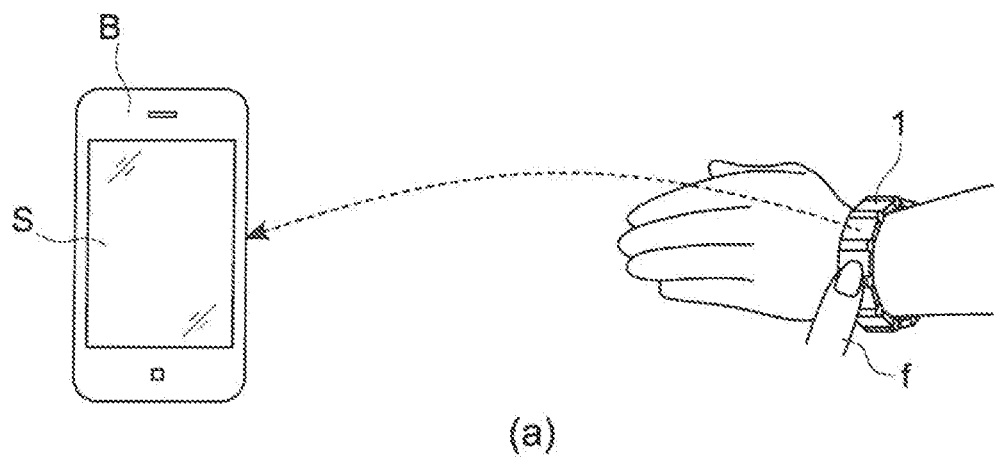
FIG. 2 Diagrams illustrating a method of using the input device.
Figure 2:
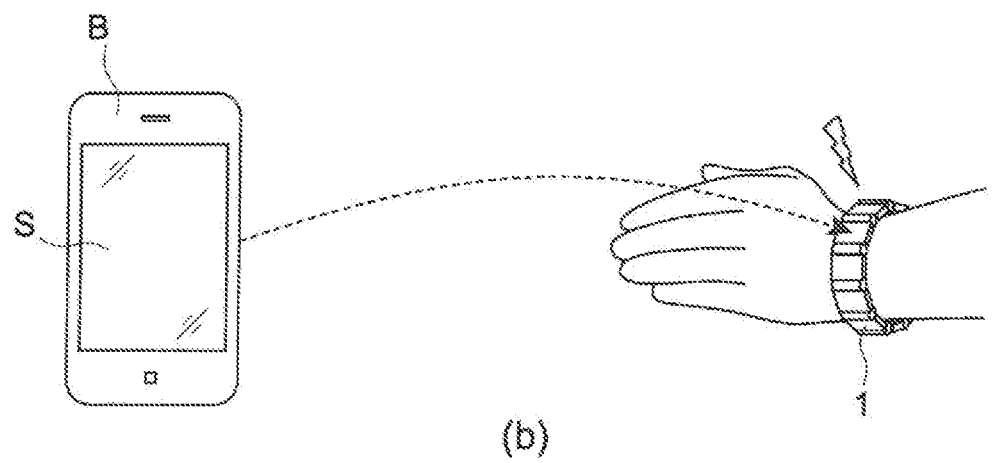
Figure 2:
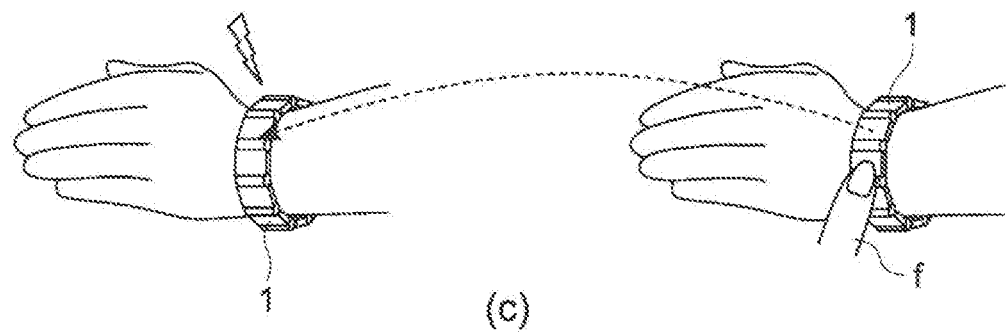

FIG. 2 is a diagram illustrating a method of using the input device 1. The input device 1 can communicate with one electronic apparatus main body B pairing communicated with the input device 1, as shown in FIG. 2(a) and FIG. 2(b), and can also communicate with the other input device 1 pairing communicated with the input device 1, as shown in FIG. 2(c).

FIG. 2 (a) shows a status in which the input device 1 is transmitting to the electronic apparatus main body B an operation signal based on an input operation by a user's finger f to the input device 1. The electronic apparatus main body B receives the operation signal from the input device 1, and exerts a variety of functions based on the operation signal received. The functions of the electronic apparatus main body B operable by the input device 1 are not especially limited. Examples of the functions of the electronic apparatus main body B include a display change of a screen S, receiving of e-mails, acquisition of positional information, switching speech and non-speech or the like.

FIG. 2(b) shows a status in which the input device 1 receives the signal transmitting from the electronic apparatus main body B. The input device 1 notifies a user corresponding to the signal from the electronic apparatus main body B by the notification unit 60. For example, the input device 1 adds vibration by the notification unit 60 when the input device 1 receives the signal showing that an e-mail is received from the electronic apparatus main body B.

FIG. 2(c) shows that a status in which users wearing the input device 1 communicates with each other. When the input device 1 on which one user performs the input operation transmits the operation signal, the other input device 1 of the other user receives the operation signal and performs a notification based on the operation signal received. In this manner, the input device 1 can make the communication between the users by utilizing light, sound, vibration or the like.

Note that the input device 1 includes a function that requires no communication with the external device such as the above-described electronic apparatus main body B and the other input device 1. For example, a user can see a cell's residual power of the power supply unit 70 by performing the input operation on the input device 1. In this case, when the cell's residual power of the input device 1 is small, melody is generated by the notification unit 60. In this way, the user can charge the input device 1 before the cell's residual power is short.

[Configuration of Input Unit 10]

Figure 3:
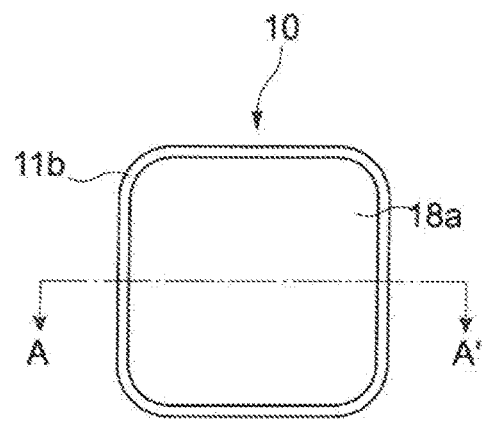
FIG. 3 A plan-view diagram of an input unit of the input device.
Figure 4:
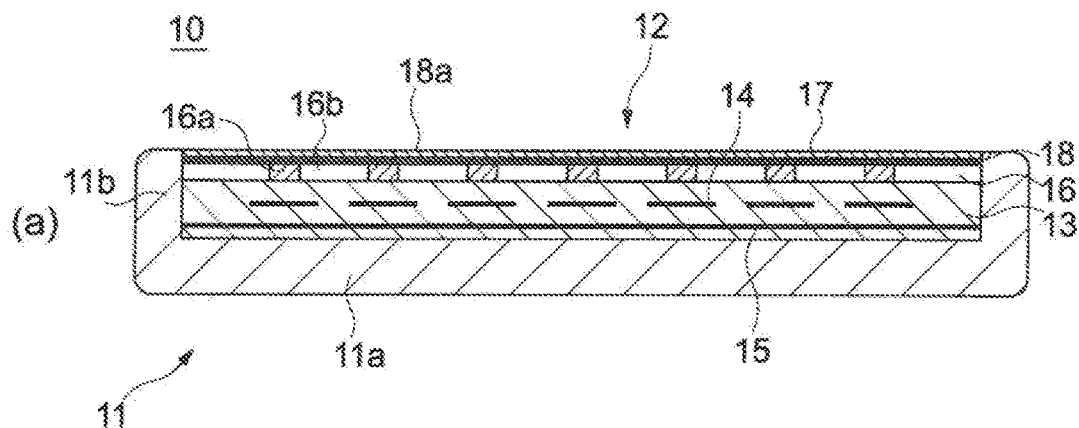
FIG. 4 Cross sectional-view diagrams of the input unit along an A-A' line in FIG. 3.
Figure 4:
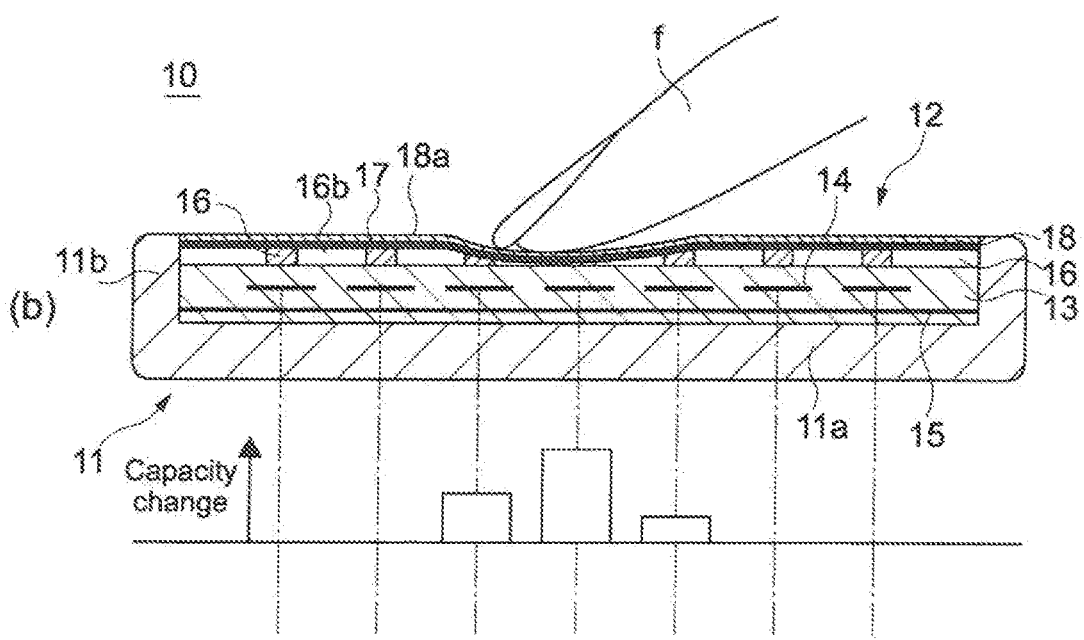

FIG. 3 and FIG. 4 show an input unit 10. FIG. 3 is a plan-view diagram, and FIG. 4 is a cross sectional-view diagrams along an A-A' line in FIG. 3. The input unit 10 has a substantially square plate shape. The input unit 10 has a concave case 11 and a sensor section 12 housed within the case 11.

The case 11 forms a concave portion by a square plate bottom 11a and a side wall 11b provided along an outer periphery of the bottom 11a. The case 11 is formed of a resin material having rigidity and an insulation property. The sensor 12 has a sensor substrate 13, an intermediate layer 16, a conductive layer 17, and an outer layer 18. The outer layer 18 defines an external form of the input unit 10 together with the case 11. An outer surface (top surface) of the outer layer 18 constitutes a detection surface 18a that receives the input operation from the user.

The sensor substrate 13 has a plurality of first electrode wires 14 and a plurality of second electrode wires 15 placed facing to a plurality of the first electrode wires 14 and intersecting with a plurality of the first electrode wires 14. The electrode wires 14, 15 constitute capacitive elements on the intersecting points. Accordingly, the sensor substrate 13 has a configuration that the capacitive elements are arranged in a matrix. An electrostatic capacity in each capacitive element of the substrate 13 changes depending on a distance between the sensor substrate 13 and the conductive layer 17.

The outer layer 18 is formed of a resin material having flexibility. The conductive layer 17 is formed at an inner surface (lower surface) of the outer layer 18. The intermediate layer 16 is placed between the conductive layer 17 and the sensor substrate 13. The intermediate layer 16 is constructed of a plurality of columnar structures 16a sandwiched between the conductive layer 17 and the sensor substrate 13. The structures 16a are formed of a resin material having flexibility, for example. The conductive layer 17 is grounded and has a reference potential.

In the input unit 10, as shown in FIG. 4(b), when the detection surface 18a is pressed by the user's finger f, the outer layer 18, the conductive layer 17 and the intermediate layer 16 deform. When the conductive layer 17 becomes closer to the sensor substrate 13 by the deformation of the conductive layer 17, the electrostatic capacity in the capacitative element near the pressing position of the sensor substrate 13 changes.

The input unit 10 outputs a detection signal corresponding to the electrostatic capacity of the sensor substrate 13 to the control unit 50 (see FIG. 1). The control unit 50 determines a pressing position on the detection surface 18a and a pressing amount in the pressing position based on the detection signal from the input unit 10. In this way, the control unit 50 can calculate an operation position on the detection surface 18a, a pressing force to the detection surface 18a, a rolling reduction speed of the detection surface 18a, a moving distance of the finger f, a moving speed of the finger f and the like. The control unit 50 recognizes the input operation performed on the detection surface 18a based on the calculation results, and generates the operation signal that is associated with the input operation.

As described above, in the input unit 10, the detection signal is generated when the detection surface 18a is pressed, but the detection signal is not generated when the user touches the detection surface 18a by mistake with no intention to perform the input operation. Accordingly, the input unit 10 prevents the user from doing erroneous operation.

Also, in the input unit 10, the detection signal is generated by the deformation of the conductive layer 17 accompanied by pressing the detection surface 18a. Accordingly, the input operation of the detection surface 18a can be performed not by a conductive manipulator such as the user's finger f and a stylus but by a user's hand, for example, wearing a glove. In addition, in the input unit 10, even when water droplets are attached to the detection surface 18a, the detection signal is less influenced. Furthermore, the input operation can be performed under water.

Note that if it is sufficient that the input unit 10 performs the input operation using the conductive manipulator, the conductive layer 17 is not essential. Also, although the input unit 10 is constituted to form a sensor in a mutual capacitance method, the input unit 10 may be constituted to form a sensor in a self-capacitance method.

[Operation Example of Input Unit 10]

Figure 5:
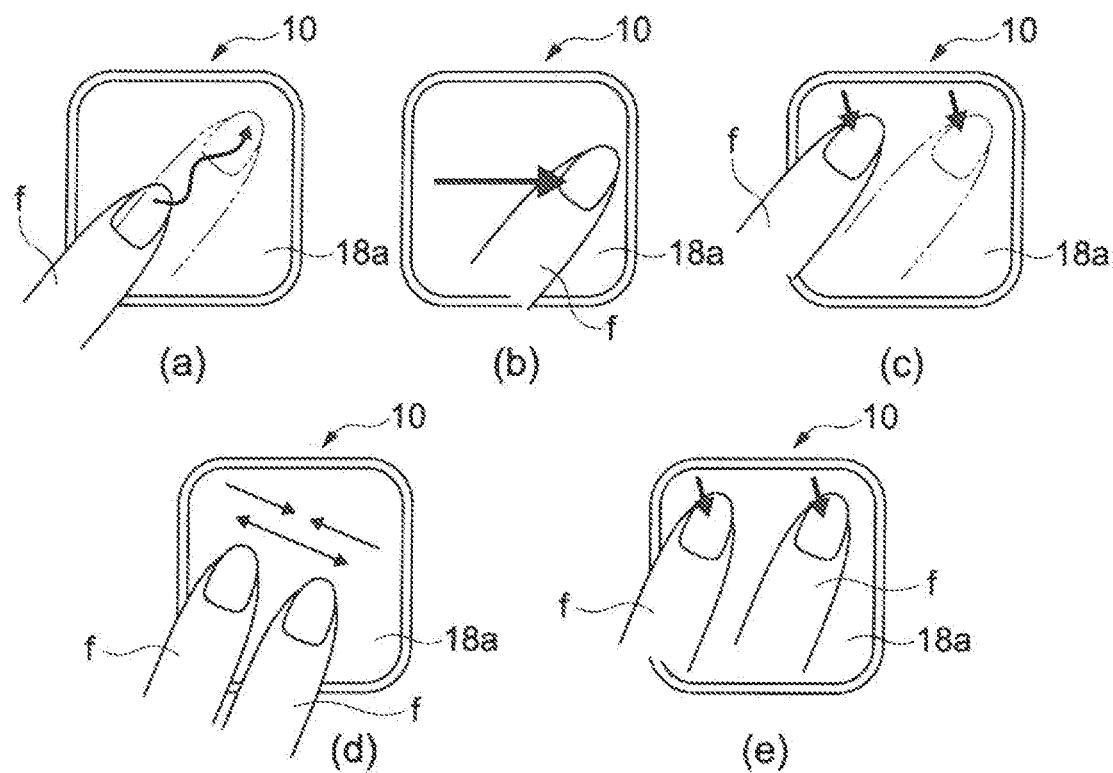
FIG. 5 Diagrams illustrating a method of operating the input unit.
Figure 6:
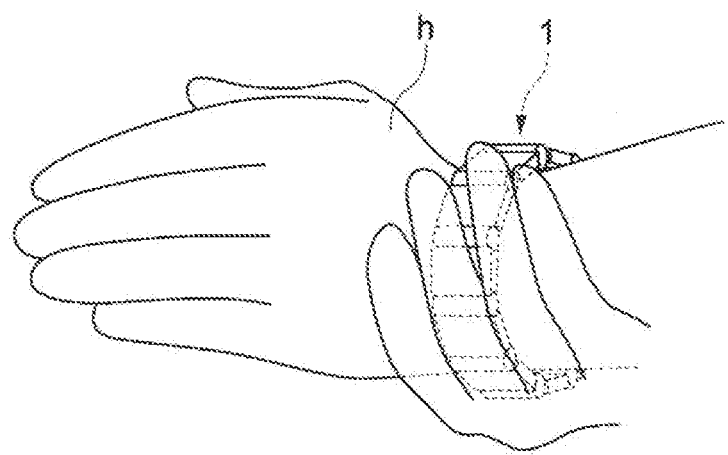
FIG. 6 A diagram illustrating a method of operating the input device.
Figure 7:
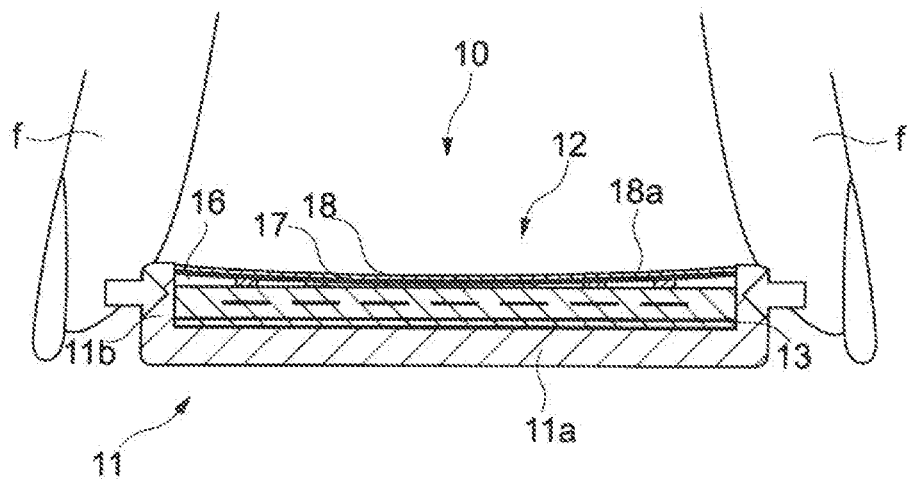
FIG. 7 A diagram illustrating a method of operating the input unit.

FIGS. 5 to 7 each is a diagram showing an operation example of the input device 1.

FIG. 5(a) shows an input operation in which the detection surface 18a of the input unit 10 is pressed by the user's finger f to move the finger f on the detection surface 18a. By the input operation, for example, depending on the moving distance and the moving speed of the finger f, a pointer within the screen S of the electronic apparatus main body B (see FIG. 2 (a) and FIG. 2(b)) can be moved.

FIG. 5(b) shows an input operation in which the detection surface 18a of the input unit 10 is pressed by the user's finger f to move the finger f in one direction. By the input operation, for example, when the moving speed of the finger f exceeds a predetermined threshold value, the screen S in the display device of the electronic apparatus main body B can be moved to the moving direction of the finger f.

FIG. 5(c) shows an input operation in which two positions on the detection surface 18a of the input unit 10 are pressed successively by the user's finger f. By the input operation, for example, depending on the distance between the two positions and the pressing force, a specific area within the screen S of the electronic apparatus main body B can be selected.

FIG. 5(d) shows an input operation in which the detection surface 18a of the input unit 10 is pressed by two user's fingers f to change a distance between the two fingers f. By the input operation, for example, depending on the distance between the two fingers f and a change speed of the distance, the screen S of the electronic apparatus main body B can be zoomed in or zoomed out.

FIG. 5(e) shows an input operation in which the detection surface 18a of the input unit 10 is pressed by the user's two fingers f. By the input operation, for example, depending on a deviation of a pressing timing and a difference in pressing forces by the two fingers f, the display in the screen S of the electronic apparatus main body B can be changed.

Note that the control unit 50 not only generates individual operation signals for the respective input units 10, but also generates operation signals corresponding to multiple input operations to a plurality of the input units 10. Examples of the multiple input operations include an input operation by an order of pressing a plurality of the input units 10, for example. In particularly, the input device 1 can be constituted such that the user can perform the input operation on successive detection surfaces 18a of a plurality of adjacent input units 10.

FIG. 6 shows an input operation in which the user holds the input device 1 worn on one hand by an opposite hand. The control unit 50 can recognize the input operation when three or more input units 10 are pressed at the same time. By the input operation, a clock within the screen S of the electronic apparatus main body B can be enlarged and displayed.

FIG. 7 shows an input operation in which the user picks the case 11 of the input unit 10 with one's fingers. More specifically, both ends of the detection surface 18a of the sensor section 12 are pressed (squeezed) via the side wall 11b of the case 11. At this time, the detection surface 18a is squeezed and pressed in its own plane direction, thereby flexing the detection surface 18a. This causes a characteristic change in the electrostatic capacity of the sensor substrate 13. The control unit 50 can recognize the input operation by the characteristic change in the electrostatic capacity. By the input operation, a display mode of the screen S of the electronic apparatus main body B can be switched.

[Detection Surface 18a of Input Unit 10]

Figure 8:
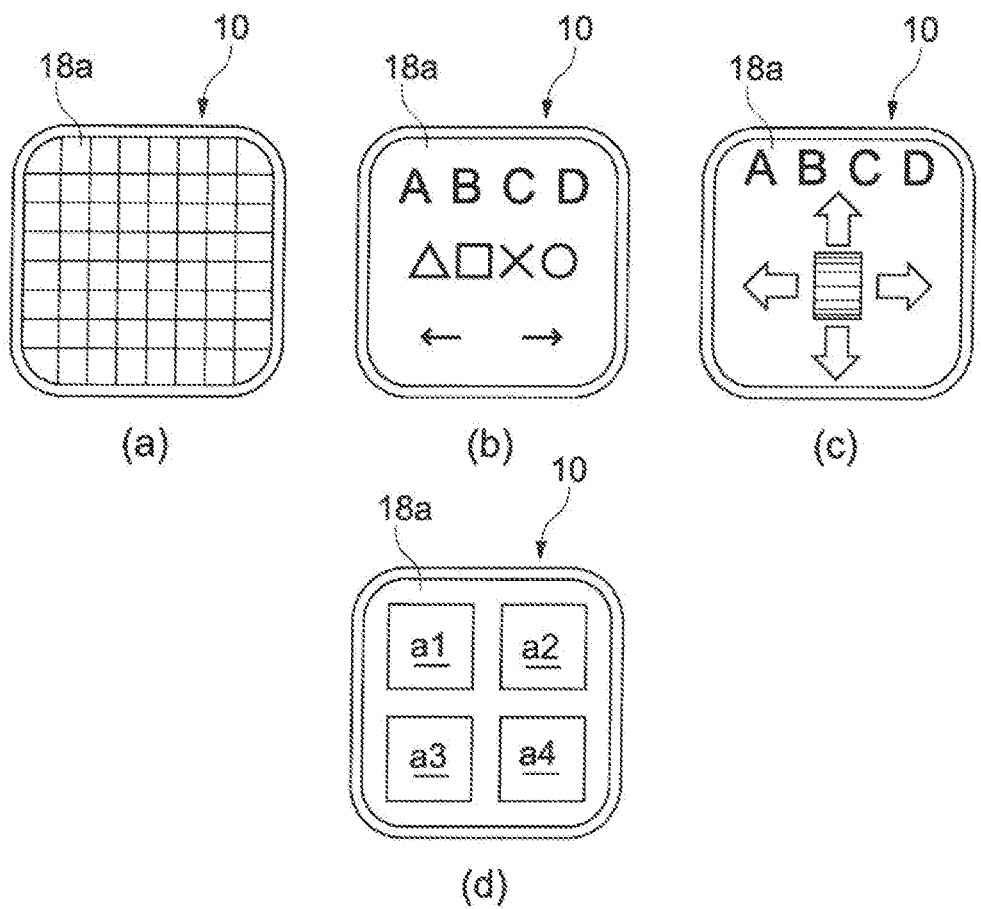
FIG. 8 Diagrams illustrating a detection surface of the input unit.
Figure 9:
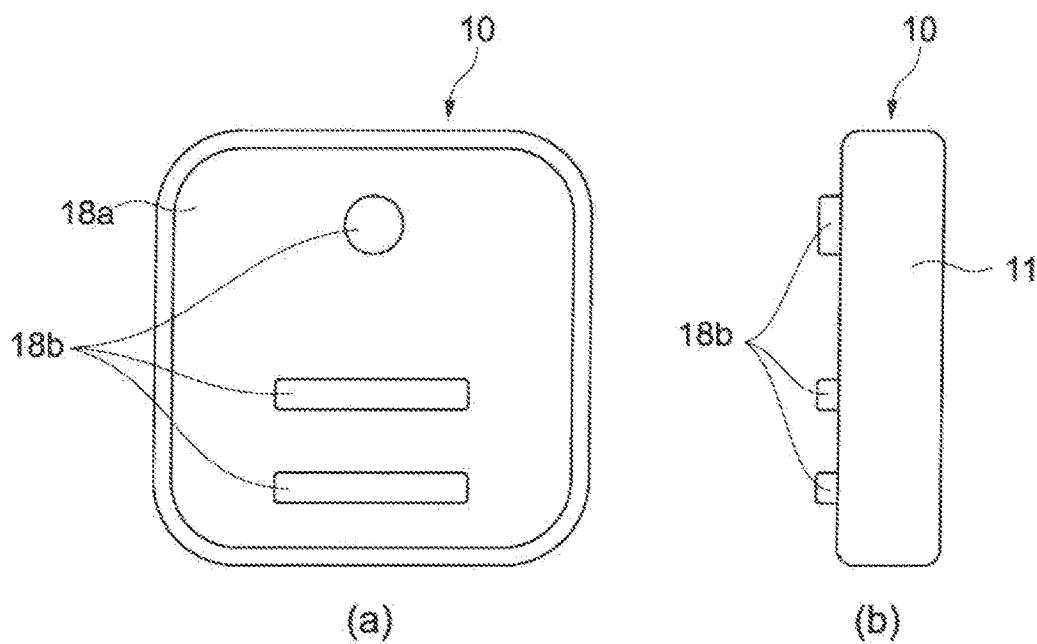
FIG. 9 Diagrams illustrating a detection surface of the input unit.

FIG. 8 and FIG. 9 illustrate the detection surface 18a. The detection surface 18a has an input guide section for easily finding the position on the detection surface 18a. FIG. 8(a) to FIG. 8(d) and FIG. 9(a) each is a plan-view diagram of the input unit 10, and FIG. 9(b) is a side view diagram of the input unit 10.

Images are drawn in the detection surfaces 18a shown in FIG. 8. In the input device 1, the images in the detection surface 18a are correlated with the positions in the detection surface 18a. The input device 1 is constituted such that when the images in the detection surface 18a are pressed, the control unit 50 generates the operation signal relating to the images.

Also, the input unit 10 may be constituted such that the outer layer 18 is a display section that displays the images on the detection surface 18a under the control unit 50. In this case, the input device 1 may change the images displayed on the detection surface 18a of each input unit 10 as appropriate. In the input device 1, the images displayed on the detection surface 18a are correlated with the positions on the detection surface 18a. Such an input device 1 is constituted such that when the images displayed on the detection surface 18a are pressed, the control unit 50 generates an operation signal relating to the images.

In FIG. 8(a), a grid is displayed on the detection surface 18a. The user will be able to press a more precise position on the detection surface 18a by means of the grid on the detection surface 18a On the detection surface 18a, other images may be displayed in addition to the grid.

In FIG. 8(b), characters, symbols and arrows are displayed on the detection surface 18a. In this way, the user will be able to selectively press the characters, the symbols and the arrows displayed on the detection surface 18a. The control unit 50 generates the operation signal correlated with the characters, the symbols and the arrows pressed based on the input operation.

In FIG. 8(c), an image of a jog dial and images of arrow keys are displayed on the detection surface 18a in addition to the characters. When the user performs the input operation of rotating the image of the jog dial up and down, the screen S of the electronic apparatus main body B (see FIG. 2(a) and FIG. 2(b)) can be scrolled, for example. In addition, when the user performs the input operation of pressing the images of the arrow keys, a pointer within the screen S of the electronic apparatus main body B can be moved corresponding to the arrow keys.

In FIG. 8(d), four areas a1, a2, a3, a4 classified by colors are provided on the detection surface 18a. By classifying the detection surface 18a by colors, the user can more intuitively recognize the position on the detection surface 18a. In this way, the user will be able to press a more precise position of the detection surface 18a.

Protrusions 18b each having a convex-concave shape are provided on the detection surface 18a shown in FIG. 9. In the configuration shown in FIG. 9, the user can recognize the protrusions lab by touching. Accordingly, the user can press a precise position within the detection surface 18a without seeing the detection surface 18a.

<Second Embodiment>

An input device 101 according to a second embodiment of the present technology is different from the input device 1 according to the first embodiment only as to the configuration of the input unit 110. Descriptions about the configurations of the input device 101 common to those according to the first embodiment will be omitted as appropriate.

Figure 10:
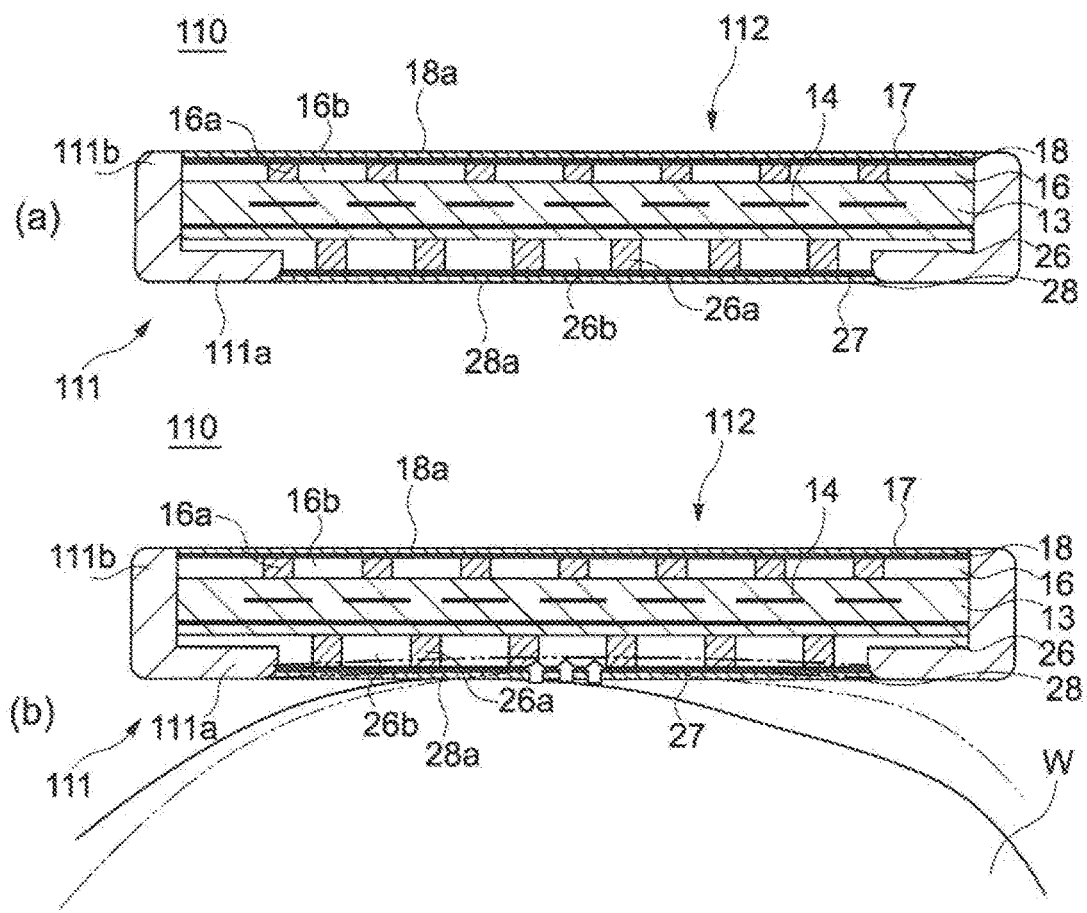
FIG. 10 Cross sectional-view diagrams of the input device according to a second embodiment of the present technology.
Figure 11:
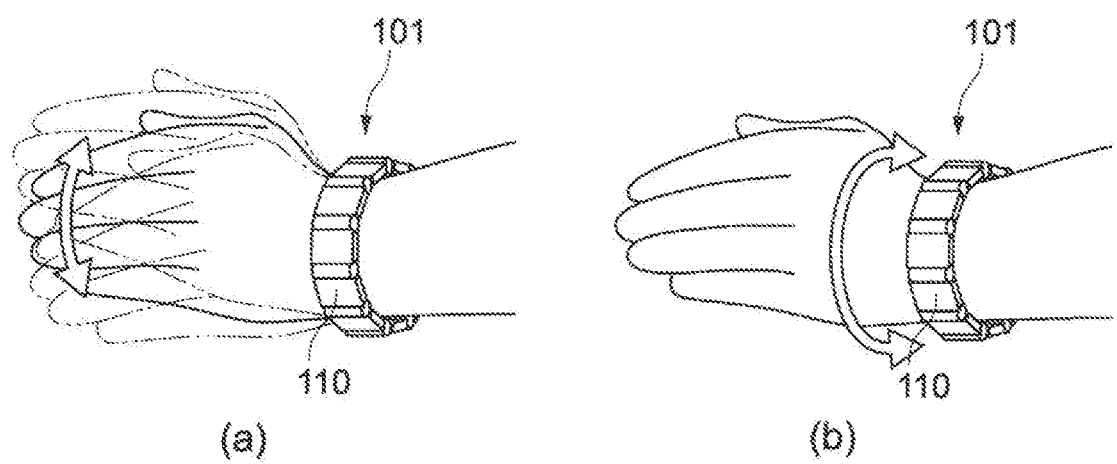
FIG. 11 Diagrams illustrating a method of operating the input device.

FIG. 10 is cross sectional-view diagrams of the input unit 110 of the input device 101, and FIG. 11 is diagrams illustrating a method of operating the input device 101. The input unit 110 includes an intermediate layer 26, a conductive layer 27, and an outer layer 28 provided on the sensor substrate 13 opposite to the intermediate layer 16, the conductive layer 17 and the outer layer 18. The intermediate layer 26 is constituted by a plurality of columnar structures 26a sandwiched between the conductive layer 27 and the sensor substrate 13.

An opening is formed at a central are of a bottom 111a of the case 111, and the outer layer 28 is exposed from the opening. An outer surface (lower surface) of the outer layer 28 is constituted as a detection surface 28a on which the user presses. That is to say, the input device 101 includes the detection surface 18a arranged along an outer peripheral surface and a detection surface 28a arranged along an inner peripheral surface. Note that the input device 101 may be constituted such that the detection surface 18a at an outer peripheral surface side is omitted.

Also, in the input unit 110, similar to the input unit 10 according to the first embodiment, when the detection surface 18a accepts an input operation and the conductive layer 17 becomes closer to the sensor substrate 13, the electrostatic capacity of sensor substrate 13 changes. Furthermore, in the input unit 110, when the detection surface 28a is pressed and the conductive layer 27 becomes closer to the sensor substrate 13, the electrostatic capacity of sensor substrate 13 changes. In the input unit 110, the control unit 50 generates the operation signal based on the input operation of the detection surface 18a, and generates the operation signal based on the pressing to the detection surface 28b.

The detection surface 28a of the input unit 110 is positioned at an inner periphery of the input device 101 and is therefore contacted with a user's arm wearing the input device 101. Accordingly, as shown in FIG. 10(b), a pressing status of the detection surface 28a in each input unit 110 changes depending on an action of the user's arm. This changes the electrostatic capacity of the sensor substrate 13, whereby the control unit 50 can recognize the action of the user's arm as the input operation.

FIG. 11(a) shows the input operation in which the user shakes the wrist, and FIG. 11(b) shows the input operation in which the user rotates the wrist. By the input operation of the action by the user, the electrostatic capacity changes specific to each sensor substrate 13. The control unit 50 can recognize the input operation by detecting the change in the electrostatic capacity.

The outer layer 18 of the input unit 110 according to the present embodiment may be constituted as the display section that can display images or videos on the detection surface 18a. The display section is driven by the control signal generated by the control unit 50. The display section can display an image showing that an e-mail is received from the electronic apparatus main body B or a latest news video, for example. The display section is constituted by known displays such as a crystal liquid display and an organic EL (Electro-Luminescence) display.

The control unit 50 can drive the display section independently for each input unit 110, and can drive the display section by taking all detection surfaces 18a of all input units 110 as one display section. In other words, the control unit 50 can display character images for each detection surface 18a of each input unit 110, and can display a long and narrow image and a character string image for all detection surfaces 18a of all input units 110.

When the user wears the input device 101 on the arm, a certain pressing status by the user's arm is generated on each detection surface 28a at an inner peripheral surface side. When the control unit 50 detects the certain pressing status on each detection surface 28a and recognizes that the input device 101 is worn by the user's arm, the operation signal can be generated. The control unit 50 can drive the display section, for example, by the operation signal.

In addition, the control unit 50 can recognize an attitude of the input device 101 for the arm based on the pressing status for each detection surface 28a. Specifically, the control unit 50 can recognize the rotation of the input device 101 to the user's arm in a circumferential direction. In this way, the control unit 50 can change the image displayed by each input unit 110 depending on the attitude of the input device 101. For example, the control unit 50 can continue to display a clock image on the display section of the input unit 110 nearest the predetermined position of the arm when the input device 101 rotates around the arm in the circumferential direction.

<Third Embodiment>

An input device 201 according to a third embodiment of the present technology is different from the input device 1 according to the first embodiment only as to the configuration described below. Descriptions about the configurations of the input device 201 common to those according to the first embodiment will be omitted as appropriate.

Figure 12:
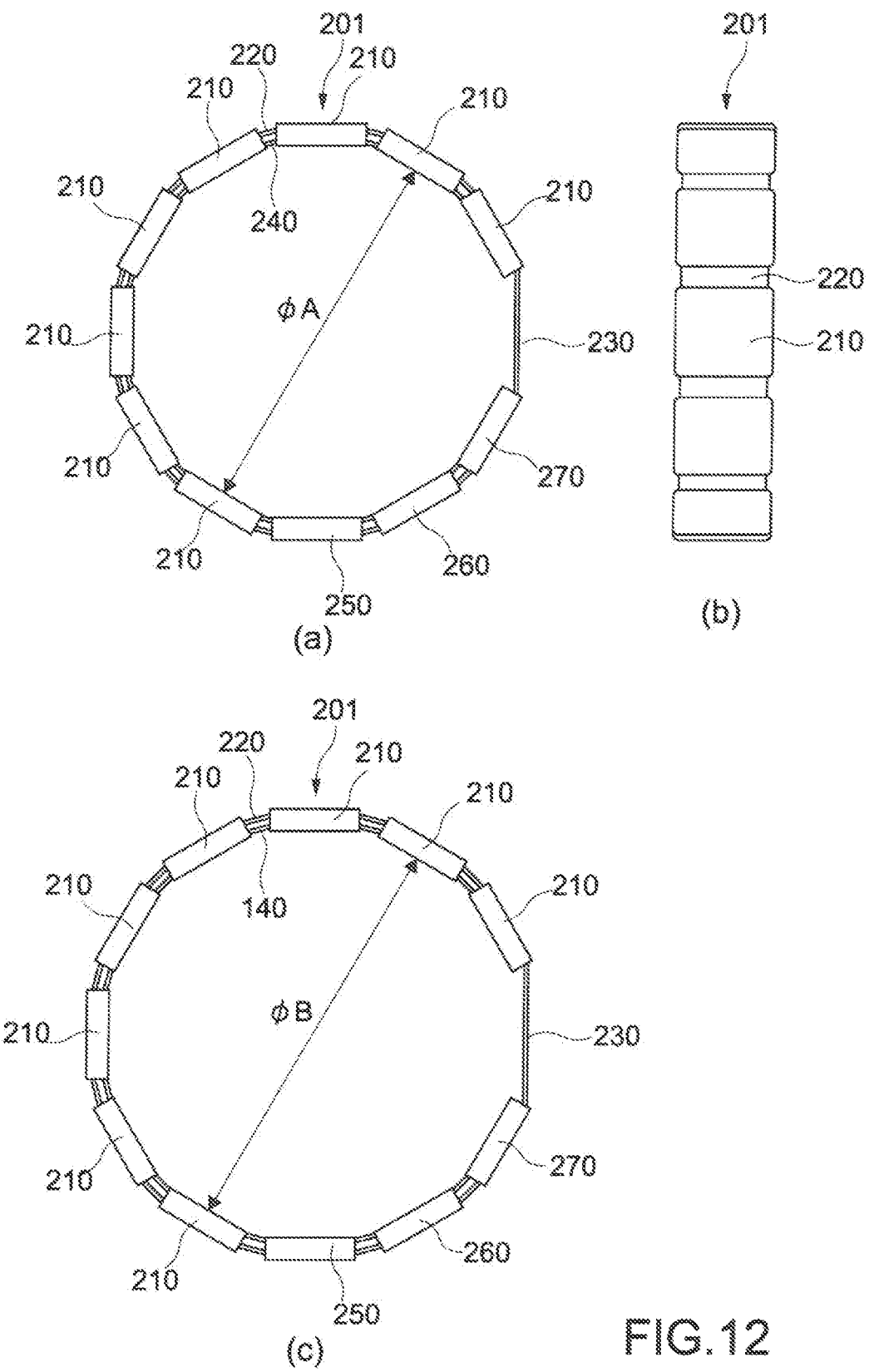
FIG. 12 Schematic diagrams of the input device according to a third embodiment of the present technology.

FIG. 12(*a*) and FIG. 12(*c*) each is a side view diagram of the input device 201 according to the third embodiment of the present technology, and FIG. 12(*b*) is a plan-view diagram of the input device 201. FIG. 12(*a*) and FIG. 12(*b*) each shows a status in which the input device 201 is in not use. FIG. 12(*c*) shows a status in which the input device 201 is in use. The input device 201 includes input units 210, a control unit 250, a notification unit 260, a power supply unit 270, linkage sections 220, a connection section 230, and wiring sections 240.

The linkage sections 220 constitutes support sections that concatenate plate units (the input units 210, the control unit 250, the notification unit 260, the power supply unit 270). Each linkage section 220 is provided as a sheet by the material having flexibility similar to the connection section 230, and supports adjacent two plate units. Each of the linkage section 220 and the connection section may be provided independently, or all of the linkage sections 220 and the connection section 230 may be integrated and concatenated in ring shape. Also, the linkage sections 220 and the wiring sections 240 may be integrated and constituted by a flexible print circuit.

An inner diameter ΦA of the input device 201 not in use shown in FIG. 12(*a*) is set to be smaller than an inner diameter of a typical user's arm. The user wears the input device 201 on the arm by extending the connection section 230 from the status shown in FIG. 12(*a*) to the inner diameter through which a user's fist can be inserted. The inner diameter ΦB of the input device 201 worn by the user's arm shown in FIG. 12(*c*) is greater than the inner diameter ΦA, and the input device 201 is firmly fixed to the user's arm by elastic forces of the connection section 230 and the linkage section 220.

The input device 201 according to the present embodiment can be worn by the user's arm including no mechanical structure such as a hinge section. Accordingly, in the input device 201, parts costs and manufacturing costs are reduced.

<Fourth Embodiment>

An input device 301 according to a fourth embodiment of the present technology is different from the input device 1 according to the first embodiment only as to the configuration described below. Descriptions about the configurations of the input device 301 common to those according to the first embodiment will be omitted as appropriate.

Figure 13:
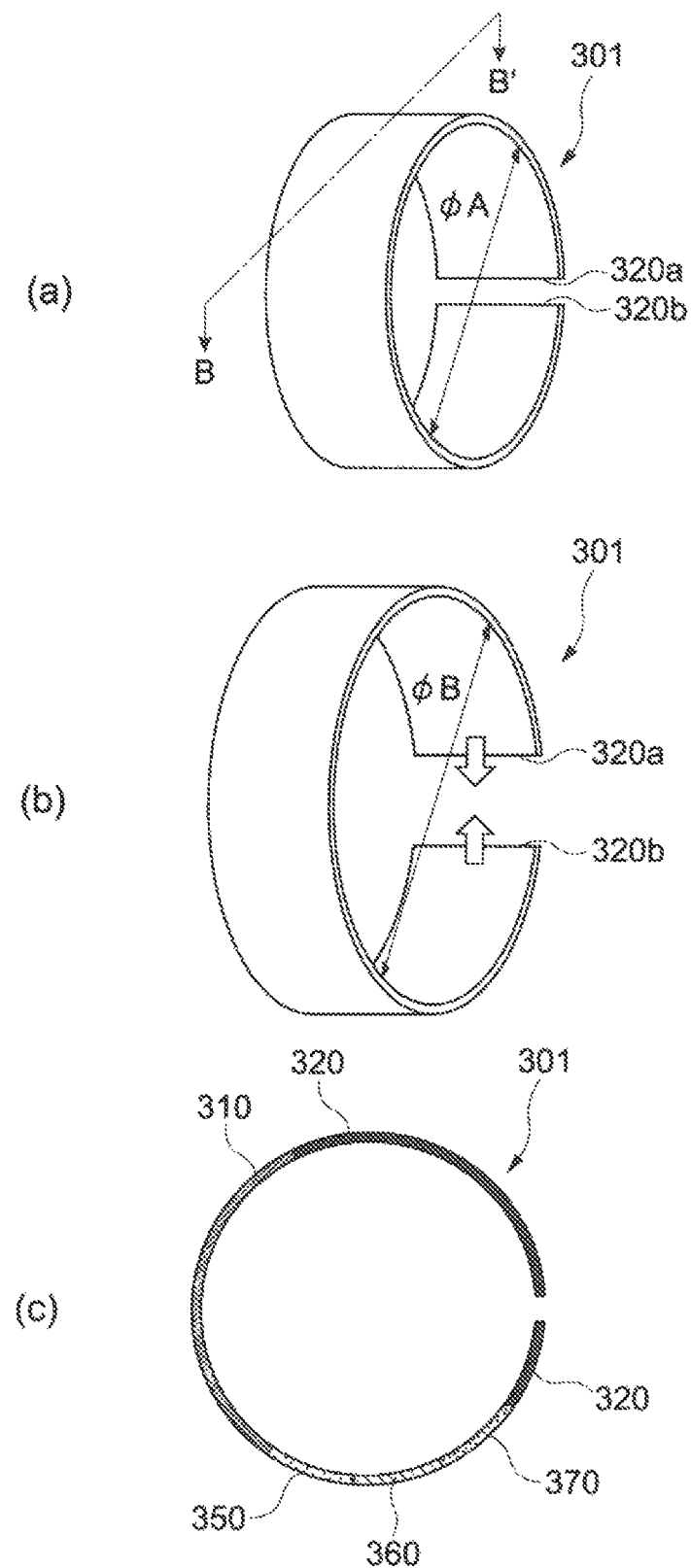
FIG. 13 Schematic diagrams of the input device according to a fourth embodiment of the present technology.

FIG. 13(*a*) and FIG. 13(*b*) each is a perspective diagram of the input device 301 according to the fourth embodiment of the present technology, and FIG. 13(*c*) is a cross sectional-view diagram of the input unit 301 along a B-B' line in FIG. 13(*a*). FIG. 13(*a*) and FIG. 13(*c*) each shows a status in which the input device 301 is in not use. FIG. 13(*b*) shows a status in which the input device 301 is in use. The input device 301 includes an input unit 310, a control unit 350, a notification unit 360, a power supply unit 370 and a frame section 320.

The input unit 310, the control unit 350, the notification unit 360, the power supply unit 370 and the frame section 320 are integrated in a C shape with an elastically deformable material such as polycarbonate and acrylic. The frame section 320 constitutes a support section that supports the input unit 310, the control unit 350, the notification unit 360 and the power supply unit 370. The frame section 320 has ends 320*a*, 320*b* spaced each other. The input unit 310 is formed in a uniform thickness of about several mm in the whole circumference.

The input unit 310, the control unit 350, the notification unit 360 and the power supply unit 370 are formed in an arc shape as shown in FIG. 13(*c*) and are electrically connected to each other. The input device 301 may be constituted by a plurality of input units 310. The plurality of the input units 310 may be placed side-by-side, or may be placed spaced apart. The detection surface of each input unit 310 is placed at least either of an outer peripheral surface and an inner peripheral surface of the input device 301.

An inner diameter ΦA of the input device 301 not in use shown in FIG. 13(*a*) is set to be smaller than an inner diameter of a typical user's arm. The user wears the input device 301 on the arm by extending the ends 320*a*, 320*b* of the frame section 320 from the status shown in FIG. 12(*a*) to the inner diameter through which a user's fist can be inserted. The inner diameter ΦB of the input device 301 worn by the user's arm shown in FIG. 13(*b*) is greater than the inner diameter ΦA, and the input device 301 is firmly fixed to the user's arm by elastic forces of the input unit 310, the control unit 350, the notification unit 360, the power supply unit 370 and the frame section 320.

While the embodiments of the present disclosure has been described above, it should be understood that the present disclosure is not limited to the above-described embodiments, and variations and modifications may be made without departing from the scope of the present disclosure.

For example, the configuration of the input unit is not limited to have the sensor substrate including a plurality of capacitive elements and the intermediate layer placed between the detection surface and the sensor substrate, and may be that the detection signal may be output corresponding to the pressing position and the pressing amount on the detection surface. For example, the input unit may have a configuration that a touch sensor, a pressure-sensitive sensor and a mechanical switch may be combined.

Furthermore, the input device may be wearable on a part of a user's body other than the user's arm. For example, the input device may be wearable on a user's finger, ankle or head.

The present technology may have the following configurations.

(1) An input device, including:
   an input section having a detection surface and configured to output a detection signal corresponding to a pressing position and a pressing amount on a detection surface;
   a control section configured to determine the pressing position and the pressing amount based on the detection signal;
   a power supply section configured to supply electricity to the input section and the control section;
   and a support section configured to be user wearable and supporting the input section, the control section, and the power supply section.

(2) The input device according to (1) above, in which
the support section is concatenated such that the input device is wearable on a user's arm, and
the detection surface is provided in at least one of an outer peripheral surface and an inner peripheral surface of the support section.

(3) The input device according to (2) above, in which
the support section supports the input section, the control section, and the power supply section, and has a plurality of concatenated plate units.

(4) The input device according to (3) above, in which
the support section further includes a hinge section that concatenates the plate units.

(5) The input device according to (3) or (4) above, in which
the plurality of the plate units includes an input unit for supporting the input section, a control unit for supporting the control section, and a power supply unit for supporting the power supply section.

(6) The input device according to (5) above, in which
the input unit has a plurality of input units, and
the control section determines the pressing position and the pressing amount per the plurality of the input units.

(7) The input device according to (2) above, in which
the support section includes an elastically deformable C-shaped frame section.

(8) The input device according to any one of (1) to (8) above, in which
the input section is configured to output a detection signal corresponding to an input operation of squeezing and pressing the detection surface in its own plane direction.

(9) The input device according to any one of (1) to (8) above, further including a communication section supported by the support section and capable of transmitting an operation signal generated based on the pressing position and the pressing amount by the control section to an external device.

(10) The input device according to (9) above, in which
the communication section receives a signal from the external device, and
the control section generates a control signal based on a signal received by the communication section.

(11) The input device according to (10) above, further including a notification section supported by the support section and configured to perform a notification based on the control signal.

(12) The input device according to (11) above, in which
the notification section includes at least one of a light-emitting element, a sound-emitting element and a vibration element.

(13) The input device according to any one of (1) to (12) above, in which
the input section further includes a sensor substrate having a plurality of capacitive elements that are placed facing to the detection surface and are arranged in a matrix; and
an intermediate layer placed between the detection surface and the sensor substrate having a plurality of structures configured to deformably support the detection surface.

(14) The input device according to (13) above, in which
the input section further includes a conductive layer placed between the detection surface and the intermediate layer.

(15) The input device according to any one of (1) to (14) above, in which
the detection surface includes an input guide section configured by at least one of an image and a convex-concave shape.

(16) The input device according to (15) above, in which
the input unit further includes a display section on which the detection surface is provided and configured to display an image on the detection surface under control by the control section.

(17) An electronic apparatus, including:
an input section having a detection surface and configured to output a detection signal corresponding to a pressing position and a pressing amount on a detection surface;
a control section configured to determine the pressing position and the pressing amount based on the detection signal;
a power supply section configured to supply electricity to the input section and the control section;
a support section configured to be user wearable and supporting the input section, the control section, and the power supply section; and
a display device configured to display an image corresponding to the operation signal.

DESCRIPTION OF REFERENCE NUMERALS 1 input device
10 input unit
20 hinge section
30 connection section
40 wiring section
50 control unit
60 notification unit
70 power supply unit

The invention claimed is:
1. An input device, comprising:
an input section that comprises:
a first detection surface;
a second detection surface;
a sensor substrate;
a first intermediate layer between the first detection surface and the sensor substrate, wherein
the first intermediate layer comprises a first plurality of structures configured to deformably support the first detection surface, and
the first plurality of structures is deformable;
a second intermediate layer between the second detection surface and the sensor substrate, wherein
the second intermediate layer comprises a second plurality of structures configured to deformably support the second detection surface, and
a number of the first plurality of structures in the first intermediate layer is greater than a number of the second plurality of structures in the second intermediate layer;
a first conductive layer between the first detection surface and the first intermediate layer; and
a second conductive layer between the second detection surface and the second intermediate layer, wherein
the first conductive layer, the first intermediate layer, the sensor substrate, and the second intermediate layer are between the first detection surface and the second conductive layer, and
the input section is configured to output a detection signal corresponding to a pressing position and a pressing amount on at least one of the first detection surface or the second detection surface;

a control section configured to determine the pressing position and the pressing amount based on the detection signal;
a power supply section configured to supply electrical power to the input section and the control section; and
a support section configured to support the input section, the control section, and the power supply section, wherein
the support section is wearable,
the first detection surface is on an outer peripheral surface of the support section, and
the second detection surface is on an inner peripheral surface of the support section.

2. The input device according to claim 1, wherein the support section is concatenated such that the input device is user wearable.

3. The input device according to claim 2, wherein the support section comprises a plurality of concatenated plate units.

4. The input device according to claim 3, wherein the support section further comprises a hinge section configured to concatenate the plurality of concatenated plate units.

5. The input device according to claim 3, wherein the plurality of concatenated plate units includes:
an input unit configured to support the input section;
a control unit configured to support the control section; and
a power supply unit configured to support the power supply section.

6. The input device according to claim 5, wherein
the input unit has a plurality of first input units, and
the control section is further configured to determine the pressing position and the pressing amount per the plurality of the first input units.

7. The input device according to claim 5, wherein
the input unit further includes a display section,
the display section includes the first detection surface, and
the display section is configured to display an image on the first detection surface under control of the control section.

8. The input device according to claim 2, wherein the support section includes an elastically deformable C-shaped frame section.

9. The input device according to claim 1, wherein
the input section is further configured to output the detection signal based on at least one of:
the first detection surface configured to be squeezed and pressed in a plane direction, or
the second detection surface configured to be squeezed and pressed in the plane direction.

10. The input device according to claim 1, wherein
the input device further comprises a communication section supported by the support section,
the control section is further configured to generate an operation signal based on the pressing position and the pressing amount, and
the communication section is configured to transmit the operation signal to an external device.

11. The input device according to claim 10, wherein
the communication section is further configured to receive a first signal from the external device, and
the control section is further configured to generate a control signal based on the received first signal.

12. The input device according to claim 11, further comprising a notification section supported by the support section, wherein the notification section is configured to generate a notification based on the control signal.

13. The input device according to claim 12, wherein the notification section includes at least one of a light-emitting element, a sound-emitting element, or a vibration element.

14. The input device according to claim 1, wherein
the sensor substrate comprises a plurality of capacitative elements in a matrix.

15. The input device according to claim 14, wherein the plurality of capacitative elements are inside the sensor substrate.

16. The input device according to claim 1, wherein
the first detection surface further includes an input guide section, and
the input guide section has at least one of an image or a convex-concave shape.

17. The input device according to claim 1, wherein
a length of the second detection surface is smaller than a length of the first detection surface, and
a length of the second conductive layer is smaller than a length of the first conductive layer.

18. An electronic apparatus, comprising:
an input section that comprises:
a first detection surface;
a second detection surface;
a sensor substrate;
a first intermediate layer between the first detection surface and the sensor substrate, wherein
the first intermediate layer comprises a first plurality of structures configured to deformably support the first detection surface, and
the first plurality of structures is deformable;
a second intermediate layer between the second detection surface and the sensor substrate, wherein
the second intermediate layer comprises a second plurality of structures configured to deformably support the second detection surface, and
a number of the first plurality of structures in the first intermediate layer is greater than a number of the second plurality of structures in the second intermediate layer;
a first conductive layer between the first detection surface and the first intermediate layer; and
a second conductive layer between the second detection surface and the second intermediate layer, wherein
the first conductive layer, the first intermediate layer, the sensor substrate, and the second intermediate layer are between the first detection surface and the second conductive layer, and
the input section is configured to output a detection signal corresponding to a pressing position and a pressing amount on at least one of the first detection surface or the second detection surface;
a control section configured to determine the pressing position and the pressing amount based on the detection signal;
a power supply section configured to supply electrical power to the input section and the control section;
a support section configured to support the input section, the control section, and the power supply section, wherein the support section is user wearable; and
a display device configured to display an image corresponding to an operation signal, wherein
the first detection surface is on an outer peripheral surface of the support section, and
the second detection surface is on an inner peripheral surface of the support section.

* * * * *